United States Patent
Downey et al.

(10) Patent No.: US 10,358,816 B2
(45) Date of Patent: Jul. 23, 2019

(54) IMPACT DAMPING MAT, EQUIPMENT ACCESSORY AND FLOORING SYSTEM

(71) Applicant: Pliteq Inc., Toronto (CA)

(72) Inventors: Paul Downey, Toronto (CA); Paul Gartenburg, Toronto (CA)

(73) Assignee: PLITEQ INC, Torinto, Ontario (CA)

( * ) Notice: Subject to any disclaimer, the term of this patent is extended or adjusted under 35 U.S.C. 154(b) by 0 days.

(21) Appl. No.: 15/918,342

(22) Filed: Mar. 12, 2018

(65) Prior Publication Data

US 2018/0202150 A1    Jul. 19, 2018

Related U.S. Application Data

(63) Continuation-in-part of application No. 14/954,185, filed on Nov. 30, 2015, now Pat. No. 9,914,011.

(Continued)

(51) Int. Cl.
E04B 1/98 (2006.01)
E04B 1/86 (2006.01)
(Continued)

(52) U.S. Cl.
CPC ........... *E04B 1/86* (2013.01); *E04B 1/985* (2013.01); *E04C 2/20* (2013.01); *E04C 2/52* (2013.01); *E04F 15/105* (2013.01); *E04F 15/107* (2013.01); *E04F 15/206* (2013.01); *E04F 15/22* (2013.01); *G10K 11/168* (2013.01); *B32B 3/06* (2013.01); *B32B 3/085* (2013.01); *B32B 3/30* (2013.01); *B32B 25/14* (2013.01);
(Continued)

(58) Field of Classification Search
CPC .. H05K 7/20454; H05K 7/186; H05K 7/1495; F16M 9/00; F16M 7/00; F16F 7/087; F16F 7/082; F16F 7/085; F16F 7/12; F16F 7/01; F16F 15/04; E04F 15/20; E04F 15/203; E04F 15/206; E04F 15/185; E04F 15/22; E04F 15/225; E04F 15/107; A63B 21/403

USPC ........ 267/140, 141, 153; 248/611, 634, 632, 248/633, 637, 638, 639, 676, 678, 348.05, 248/346.05, 560; 52/167.1, 167.7, 167.8, 52/126.1, 126.5, 126.7, 126.6; 472/92

See application file for complete search history.

(56) References Cited

U.S. PATENT DOCUMENTS 205,271 A    6/1878    Hyatt
1,554,179 A    9/1925    Trader
(Continued)

FOREIGN PATENT DOCUMENTS

DE    3407031 A1    9/1985
DE    4141023 A1    6/1993
(Continued)

*Primary Examiner* — Babajide A Demuren
(74) *Attorney, Agent, or Firm* — Tarolli, Sundheim, Covell & Tummino LLP

(57) ABSTRACT

An impact damping mat comprises a plurality of layers arranged in a stacked formation. The stacked formation has a total thickness of no greater than 4 and 7/16 inches. The plurality of layers cooperate to provide the impact damping mat with at least one of a coefficient of restitution no greater than 30% and a selected sound reduction characteristic. The selected sound reduction characteristic can be a reduction of a maximum sound level of at least 5 dB from 40 to 63 Hz 1/3 octave bands and at least 13 dB at and above 80 Hz 1/3 octave bands normalized to a conventional 3/8 inch rollout rubber flooring product.

20 Claims, 9 Drawing Sheets

Related U.S. Application Data

(60) Provisional application No. 62/184,352, filed on Jun. 25, 2015.

(51) Int. Cl.

| | | |
|---|---|---|
| *G10K 11/168* | (2006.01) | |
| *E04C 2/20* | (2006.01) | |
| *E04F 15/10* | (2006.01) | |
| *E04F 15/20* | (2006.01) | |
| *E04F 15/22* | (2006.01) | |
| *E04C 2/52* | (2006.01) | |
| *E04B 1/84* | (2006.01) | |
| *B32B 3/08* | (2006.01) | |
| *B32B 3/06* | (2006.01) | |
| *B32B 25/14* | (2006.01) | |
| *B32B 3/30* | (2006.01) | |
| *F16F 9/30* | (2006.01) | |

(52) U.S. Cl.
CPC ......... *E04B 1/98* (2013.01); *E04B 2001/8466* (2013.01); *E04B 2001/8476* (2013.01); *E04F 15/225* (2013.01); *E04F 2201/0138* (2013.01); *E04F 2201/022* (2013.01); *E04F 2290/043* (2013.01); *E04F 2290/044* (2013.01); *F16F 9/306* (2013.01)

(56) References Cited

U.S. PATENT DOCUMENTS

| | | |
|---|---|---|
| 1,940,105 A | 12/1933 | Schmid |
| 2,001,916 A | 5/1935 | Mazer |
| 2,077,617 A | 4/1937 | Cramer |
| 2,270,902 A | 1/1942 | Rubissow |
| 2,288,054 A | 6/1942 | Walton |
| 2,290,622 A | 7/1942 | Carter |
| 2,337,525 A | 12/1943 | Peik |
| 2,665,848 A | 1/1954 | Smith |
| 2,768,091 A | 10/1956 | Cubberley |
| 2,821,254 A | 1/1958 | Kernen |
| 2,862,255 A | 12/1958 | Nelson |
| 2,940,887 A | 6/1960 | Daly et al. |
| 2,961,029 A | 11/1960 | Rainar |
| 3,026,224 A | 3/1962 | Rogers, Jr. |
| 3,160,549 A | 12/1964 | Caldwell et al. |
| 3,311,331 A | 3/1967 | Steimen |
| 3,345,245 A | 10/1967 | Hanusa |
| 3,399,103 A | 8/1968 | Salyer et al. |
| 3,418,812 A | 12/1968 | Khan et al. |
| 3,436,042 A | 4/1969 | Van Goubergen |
| 3,459,400 A | 8/1969 | Rothermel |
| 3,567,563 A | 3/1971 | Haudenchild et al. |
| 3,579,941 A | 5/1971 | Tibbals |
| 3,641,855 A | 2/1972 | Balle |
| 3,770,560 A | 11/1973 | Elder |
| 3,893,619 A | 7/1975 | Bruner |
| 3,917,501 A | 11/1975 | Ferrucci et al. |
| 3,924,907 A | 12/1975 | Czernik et al. |
| 3,948,009 A | 4/1976 | Bernhard |
| 3,985,198 A | 10/1976 | Kurtze et al. |
| 4,002,315 A | 1/1977 | Van Goubergen |
| 4,060,502 A | 11/1977 | Benton |
| 4,112,176 A | 9/1978 | Bailey |
| 4,143,495 A | 3/1979 | Hintz |
| 4,179,067 A | 12/1979 | Baier |
| 4,190,131 A | 2/1980 | Robinson |
| 4,242,391 A | 12/1980 | Reinhardt et al. |
| 4,244,841 A | 1/1981 | Frankland |
| 4,265,398 A | 5/1981 | Luebke |
| 4,361,614 A | 11/1982 | Moffitt, Jr. |
| 4,428,454 A | 1/1984 | Capaul et al. |
| 4,454,181 A | 6/1984 | Hohn |
| 4,457,120 A | 7/1984 | Takata |
| 4,500,037 A | 2/1985 | Braitsch et al. |
| 4,551,362 A | 11/1985 | Harms et al. |
| 4,566,231 A | 1/1986 | Konsevich |
| 4,637,942 A | 1/1987 | Tomarin |
| 4,672,100 A | 6/1987 | Schonbachler |
| 4,681,786 A | 7/1987 | Brown |
| 4,685,259 A | 8/1987 | Eberhart et al. |
| 4,694,627 A | 9/1987 | Omholt |
| 4,696,429 A | 9/1987 | Ortwein |
| 4,720,043 A | 1/1988 | Ortwein |
| 4,753,841 A | 6/1988 | Noel et al. |
| 4,755,408 A | 7/1988 | Noel |
| 4,771,944 A | 9/1988 | Brister |
| 4,803,112 A | 2/1989 | Kakimoto et al. |
| 4,851,500 A | 7/1989 | Lalwani |
| 4,860,506 A | 8/1989 | Yoshimi et al. |
| 4,888,927 A | 12/1989 | Yoshimi et al. |
| 4,909,003 A | 3/1990 | Hennigan |
| 4,910,935 A | 3/1990 | Leukel et al. |
| 4,917,932 A | 4/1990 | McClung |
| 4,945,697 A | 8/1990 | Ott et al. |
| 4,957,798 A | 9/1990 | Bogdany |
| 4,967,529 A | 11/1990 | L Heureux |
| 4,973,505 A | 11/1990 | Bielous |
| 5,016,413 A | 5/1991 | Counihan |
| 5,060,856 A | 10/1991 | Ortwein |
| 5,096,772 A | 3/1992 | Snyder |
| 5,110,660 A | 5/1992 | Wolf |
| 5,183,438 A | 2/1993 | Blom |
| 5,187,905 A | 2/1993 | Pourtau et al. |
| 5,258,222 A | 11/1993 | Crivelli |
| 5,383,314 A | 1/1995 | Rothberg |
| 5,424,099 A | 6/1995 | Stewart et al. |
| 5,438,171 A | 8/1995 | Schmanski |
| 5,439,735 A | 8/1995 | Jamison |
| 5,472,750 A | 12/1995 | Miller |
| 5,482,754 A | 1/1996 | Crook |
| 5,487,501 A | 1/1996 | Engst et al. |
| 5,527,409 A | 6/1996 | Lanphier |
| 5,572,842 A | 11/1996 | Stief et al. |
| 5,584,950 A | 12/1996 | Gaffigan |
| 5,619,832 A | 4/1997 | Myrvold |
| 5,653,099 A | 8/1997 | MacKenzie |
| 5,714,219 A | 2/1998 | Mashunkashey et al. |
| 5,721,035 A | 2/1998 | Dunn |
| 5,738,279 A | 4/1998 | Ihle et al. |
| 5,744,763 A | 4/1998 | Iwasa et al. |
| 5,766,721 A | 6/1998 | Bussey, Jr. et al. |
| 5,851,338 A | 12/1998 | Pushaw |
| 5,853,352 A | 12/1998 | Login |
| 5,867,957 A | 2/1999 | Holtrop |
| 5,873,936 A | 2/1999 | Ogden |
| 5,879,781 A | 3/1999 | Mehta et al. |
| 5,956,921 A | 9/1999 | Fleck et al. |
| 6,077,613 A | 6/2000 | Gaffigan |
| 6,182,413 B1 | 2/2001 | Magnusson |
| 6,212,838 B1 | 4/2001 | Eda |
| 6,213,252 B1 | 4/2001 | Ducharme |
| 6,224,707 B1 | 5/2001 | Lion |
| 6,235,367 B1 | 5/2001 | Holmes et al. |
| 6,251,493 B1 | 6/2001 | Johnson et al. |
| 6,256,955 B1 | 7/2001 | Lolley et al. |
| 6,291,048 B1 | 9/2001 | Jerdee et al. |
| 6,372,069 B1 | 4/2002 | Walls |
| 6,386,461 B1 | 5/2002 | Wildgoose |
| 6,427,925 B1 | 8/2002 | Gaudet |
| 6,468,631 B1 | 10/2002 | Pahl et al. |
| 6,481,637 B1 | 11/2002 | McQueen |
| 6,541,105 B1 | 4/2003 | Park |
| 6,595,321 B1 | 7/2003 | Tompson |
| 6,602,586 B2 | 8/2003 | Kakimoto et al. |
| 6,708,896 B2 | 3/2004 | Robinson |
| 6,723,413 B2 | 4/2004 | Walters |
| 6,769,834 B1 | 8/2004 | Stange |
| 6,786,852 B2 | 9/2004 | Watterson et al. |
| 6,796,096 B1 | 9/2004 | Heath |
| 6,918,215 B2 | 7/2005 | Smith |
| 6,920,723 B2 | 7/2005 | Downey |
| 6,945,007 B2 | 9/2005 | Kobayashi et al. |
| 6,990,703 B2 | 1/2006 | Brown et al. |

(56) References Cited

U.S. PATENT DOCUMENTS

| | | |
|---|---|---|
| 7,055,649 B2 | 6/2006 | Tompson et al. |
| 7,080,712 B2 | 7/2006 | Tsuiki et al. |
| 7,096,630 B1 | 8/2006 | Keene |
| 7,166,678 B2 | 1/2007 | Dunlap et al. |
| 7,182,994 B1 | 2/2007 | Scott |
| 7,263,028 B2 | 8/2007 | Thomas et al. |
| 7,265,178 B2 | 9/2007 | Maier et al. |
| 7,278,588 B2 | 10/2007 | English et al. |
| 7,331,534 B2 | 2/2008 | McQueen |
| 7,464,791 B2 | 12/2008 | Cooksey et al. |
| 7,566,374 B2 | 7/2009 | Brazier et al. |
| 7,587,865 B2 | 9/2009 | Moller, Jr. |
| 7,730,684 B1 | 6/2010 | Keene |
| 7,730,685 B1 | 6/2010 | Keene |
| RE41,945 E | 11/2010 | Downey |
| 7,850,498 B2 | 12/2010 | Yeh |
| 7,987,645 B2 | 8/2011 | Tinianov |
| 8,015,848 B2 | 9/2011 | Colon et al. |
| 8,113,495 B2 | 2/2012 | Downey |
| 9,545,771 B2 | 1/2017 | Sosnowski |
| 2001/0052550 A1 | 12/2001 | Janssens |
| 2002/0005250 A1 | 1/2002 | Jerdee et al. |
| 2002/0015840 A1 | 2/2002 | Kakimoto |
| 2002/0040079 A1 | 4/2002 | Lee et al. |
| 2002/0074075 A1 | 6/2002 | Brown et al. |
| 2002/0088193 A1 | 7/2002 | Reimers et al. |
| 2002/0119716 A1 | 8/2002 | Santhosh |
| 2003/0033779 A1 | 2/2003 | Downey |
| 2003/0037508 A1 | 2/2003 | Kobayashi et al. |
| 2003/0040405 A1 | 2/2003 | Watterson et al. |
| 2003/0102184 A1 | 6/2003 | Brisson et al. |
| 2004/0050482 A1 | 3/2004 | Abrams |
| 2004/0055813 A1 | 3/2004 | Tsuiki et al. |
| 2004/0096645 A1 | 5/2004 | Hancy et al. |
| 2004/0123555 A1 | 7/2004 | Cole |
| 2004/0127614 A1 | 7/2004 | Jiang et al. |
| 2004/0202854 A1 | 10/2004 | Esparza |
| 2005/0023080 A1 | 2/2005 | Tompson et al. |
| 2005/0031829 A1 | 2/2005 | Crenshaw et al. |
| 2005/0032447 A1 | 2/2005 | Tachibana et al. |
| 2005/0037174 A1 | 2/2005 | Streeton et al. |
| 2005/0098648 A1 | 5/2005 | McQueen |
| 2005/0126848 A1 | 6/2005 | Siavoshai et al. |
| 2005/0221039 A1 | 10/2005 | Dunlap et al. |
| 2005/0282465 A1 | 12/2005 | McNab |
| 2006/0008612 A1 | 1/2006 | Brazier et al. |
| 2006/0016635 A1 | 1/2006 | Downey |
| 2006/0024453 A1 | 2/2006 | Setser et al. |
| 2006/0037815 A1 | 2/2006 | Schabel, Jr. |
| 2006/0072372 A1 | 4/2006 | Thomas et al. |
| 2006/0097064 A1 | 5/2006 | English et al. |
| 2006/0105136 A1 | 5/2006 | Brazier et al. |
| 2006/0151908 A1 | 7/2006 | Brazier et al. |
| 2006/0156663 A1 | 7/2006 | Mao |
| 2006/0162997 A1 | 7/2006 | Cooksey et al. |
| 2006/0165950 A1 | 7/2006 | Dodge, III |
| 2006/0167206 A1 | 7/2006 | Maier et al. |
| 2006/0189750 A1 | 8/2006 | Maier |
| 2006/0191743 A1 | 8/2006 | Pike, Sr. et al. |
| 2006/0205869 A1 | 9/2006 | Steidl et al. |
| 2006/0230699 A1 | 10/2006 | Keene |
| 2007/0004306 A1 | 1/2007 | Leeser et al. |
| 2007/0172629 A1 | 7/2007 | Dodge |
| 2007/0261365 A1 | 11/2007 | Keene |
| 2008/0010930 A1 | 1/2008 | Mao |
| 2008/0081153 A1 | 4/2008 | Yeh |
| 2009/0283658 A1 | 11/2009 | Keene |
| 2010/0229486 A1 | 9/2010 | Keene |
| 2011/0107700 A1 | 5/2011 | Keene |
| 2012/0167522 A1 | 7/2012 | Pien |
| 2013/0139464 A1 | 6/2013 | Delong et al. |
| 2013/0180187 A1 | 7/2013 | Takeshita et al. |
| 2013/0312364 A1 | 11/2013 | Krovats |
| 2014/0099847 A1 | 4/2014 | Tsai |
| 2015/0059276 A1 | 3/2015 | Valentine |
| 2015/0345154 A1 | 12/2015 | Permesang |
| 2016/0251862 A1 | 9/2016 | Chen |

FOREIGN PATENT DOCUMENTS

| | | |
|---|---|---|
| DE | 19932991 A1 | 6/2000 |
| EP | 0916629 A1 | 5/1999 |
| EP | 0982444 A1 | 3/2000 |
| EP | 1447495 A1 | 8/2004 |
| EP | 1739253 A2 | 1/2007 |
| EP | 1757750 A1 | 2/2007 |
| FR | 2503206 A1 | 10/1982 |
| FR | 2824094 A1 | 10/2002 |
| GB | 841867 A | 7/1960 |
| GB | 1120827 A | 7/1968 |
| GB | 2379934 A | 3/2003 |
| GB | 2428698 A | 2/2007 |
| GB | 2437180 A | 10/2007 |
| JP | 48014737 A | 2/1973 |
| JP | 8297492 A | 11/1996 |
| JP | 200054610 A | 2/2000 |
| WO | 8302127 A1 | 6/1983 |
| WO | 87/00828 A1 | 2/1987 |
| WO | 93/12283 A1 | 6/1993 |
| WO | 99/66144 A1 | 12/1999 |
| WO | 01/55530 A1 | 8/2001 |
| WO | 02/35025 A1 | 5/2002 |
| WO | 02/094550 A1 | 5/2002 |
| WO | 2004/031501 A1 | 4/2004 |
| WO | 2004/058416 A1 | 7/2004 |
| WO | 2006/131138 A1 | 12/2006 |
| WO | 2007/015081 A1 | 2/2007 |
| WO | 2007/082339 A1 | 7/2007 |

IMPACT DAMPING MAT, EQUIPMENT ACCESSORY AND FLOORING SYSTEM

CROSS REFERENCE TO RELATED APPLICATION

This application is a continuation-in-part of U.S. patent application Ser. No. 14/954,185, filed on Nov. 30, 2015, now issued under U.S. Pat. No. 9,914,011 on Mar. 13, 2018, which claims the benefit of U.S. Provisional Application No. 62/184,352 filed on Jun. 25, 2015, the entire contents of which are incorporated herein by reference.

FIELD

The subject application relates generally to impact damping, and more particularly to an impact damping mat, an equipment accessory and a flooring system for mitigating impact generated rebound, noise and/or vibration, for example, from high-impact fitness related activities.

BACKGROUND

Maintaining an active and healthy lifestyle is becoming increasingly important to people and engaging in a regular fitness routine may be part of that lifestyle. In some situations, these fitness routines may include high-impact training such as CrossFit or Olympic lifting where dropping weights on the floor is common. Weights dropped during these high-impact activities may rebound from the floor increasing the risk of injury to nearby persons and the risk of damage to surrounding structures and equipment. These high-impact activities may also generate significant vibrations, some of which may be audible as noise. These vibrations may propagate into and through surrounding structures creating undesirable noise and vibration pollution for nearby persons. Undesirable rebound and noise may also be generated by other high-impact activities unrelated to fitness, such as by moving equipment, by impacts from heavy objects or simply by high-traffic environments. Consequently, mitigating the rebound of objects and the noise they generate may be particularly desirable for locations where these high-impact activities take place, especially when these high-impact activities take place in gyms or other fitness, sports or training facilities located in buildings with other tenants.

Conventional noise mitigating mats and the like are often unsuitable for use with high-impact activities. For example, they may break down under the significant forces generated by the repetitive impacts, or insufficiently reduce rebound and vibrations. A durable and adaptable impact damping mat, equipment accessory and flooring system suitable for high-impact activities is desired.

It is therefore an object at least to provide a novel impact damping mat, a novel equipment accessory and a novel flooring system.

SUMMARY

It should be appreciated that this summary is provided to introduce a selection of concepts in a simplified form that are further described below in the detailed description. This summary is not intended to be used to limit the scope of the claimed subject matter.

Accordingly, in one aspect there is provided an impact damping mat comprising: a plurality of layers arranged in a stacked formation, the stacked formation having a total thickness no greater than 4 and $7/16$ inches and the plurality of layers cooperating to provide the impact damping mat with at least one of: a coefficient of restitution no greater than 30%; and a selected sound reduction characteristic, the selected sound reduction characteristic being a reduction of a maximum sound level of at least 5 dB from 40 to 63 Hz 1/3 octave bands and at least 13 dB at and above 80 Hz 1/3 octave bands normalized to a conventional $3/8$ inch rollout rubber flooring product.

In one embodiment, the plurality of layers comprises a base layer, an intermediate layer and an upper layer.

The intermediate layer in one form is a damping layer that is formed of a polyether urethane material. The damping layer has a thickness of $1/4$ of an inch to 1 and $1/2$ inches, inclusive, and a weight of less than 2.5 lbs per 1 ft$^2$.

The upper layer in one form is formed of rubber and has a thickness of 1 inch to 1 and $1/2$ inches, inclusive, and has a weight of less than 30 lbs per 4 ft$^2$.

The base layer in one form is formed of rubber and has a thickness no greater than 1 inch and has a weight of less than 300 lbs per 120 ft$^2$.

In one embodiment, the plurality of layers further comprises a load distribution layer interposed between the intermediate layer and the upper layer.

The load distribution layer in one form is formed of rubber and has a thickness of $3/16$ of an inch to $7/16$ of an inch, inclusive, and has a density of less than 70 lbs/ft$^3$.

In one embodiment, the plurality of layers cooperate to provide the impact damping mat with both the coefficient of restitution no greater than 30% and the selected sound reduction characteristic.

In one embodiment, the upper layer comprises at least one interlocking feature thereon to engage adjacent structure. For example, in one form the at least one interlocking feature may comprise an elongate projection running along a majority of the length of a respective upper layer side wall.

According to another aspect there is provided a flooring system comprising: at least one impact damping zone with a plurality of layers arranged in a stacked formation having a generally planar top surface, the plurality of layers having a total thickness no greater than 4 and $7/16$ inches and cooperating to provide at least one of: a coefficient of restitution no greater than 30%; and a selected sound reduction characteristic, the selected sound reduction characteristic being a reduction of a maximum sound level of at least 5 dB from 40 to 63 Hz 1/3 octave bands and at least 13 dB at and above 80 Hz 1/3 octave bands normalized to a conventional $3/8$ inch rollout rubber flooring product.

BRIEF DESCRIPTION OF THE DRAWINGS

Embodiments will now be described more fully with reference to the accompanying drawings in which.

DETAILED DESCRIPTION OF EMBODIMENTS

The foregoing summary, as well as the following detailed description of certain examples will be better understood when read in conjunction with the appended drawings. As used herein, an element or feature introduced in the singular and preceded by the word "a" or "an" should be understood as not necessarily excluding the plural of the elements or features. Further, references to "one example" or "one embodiment" are not intended to be interpreted as excluding the existence of additional examples or embodiments that also incorporate the described elements or features. Moreover, unless explicitly stated to the contrary, examples or embodiments "comprising" or "having" or "including" an element or feature or a plurality of elements or features having a particular property may include additional elements or features not having that property. Also, it will be appreciated that the terms "comprises", "has", "includes" means "including by not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of description to describe the relationship of an element or feature to another element or feature as illustrated in the figures. The spatially relative terms can however, encompass different orientations in use or operation in addition to the orientation depicted in the figures.

Figure 1:
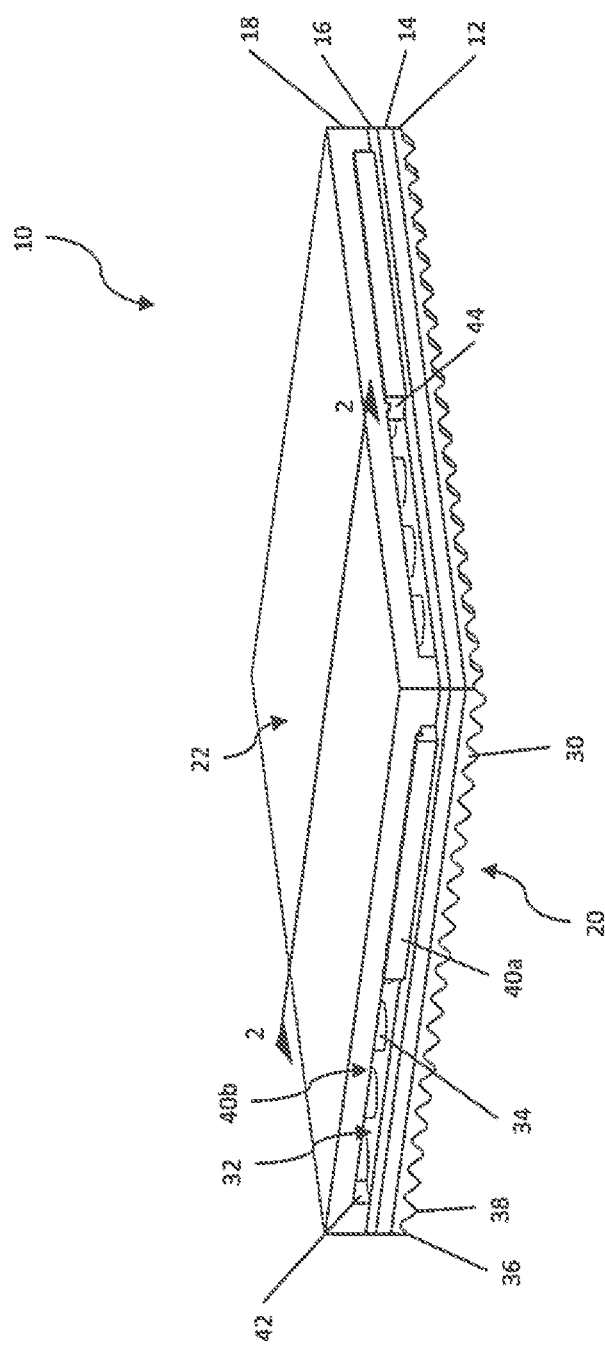
FIG. 1 is an axonometric view of an impact damping mat.
Figure 2:
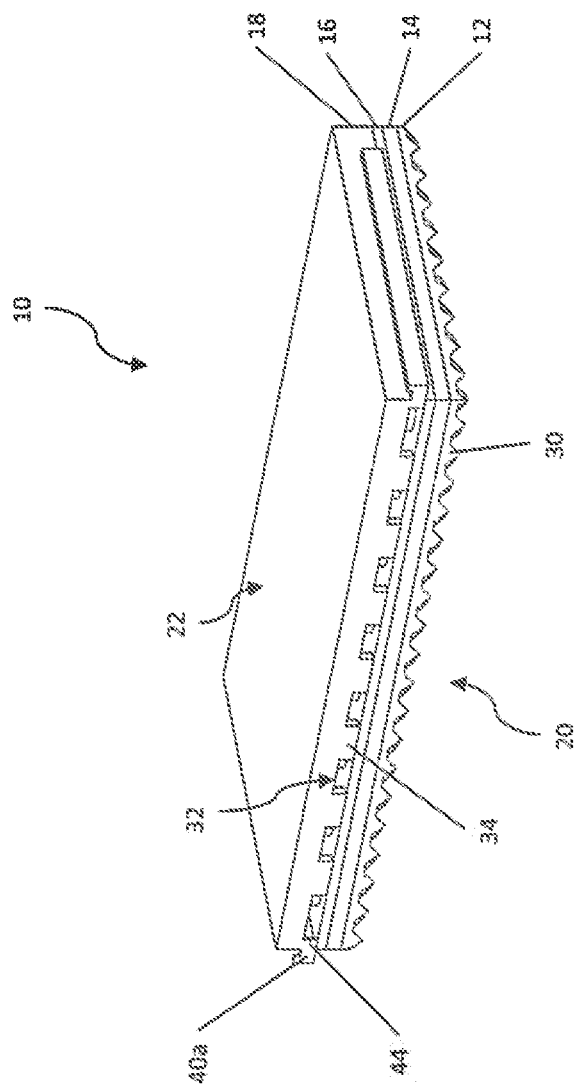
FIG. 2 is a section view of the impact damping mat of FIG. 1 taken through line 2-2.
Figure 3:
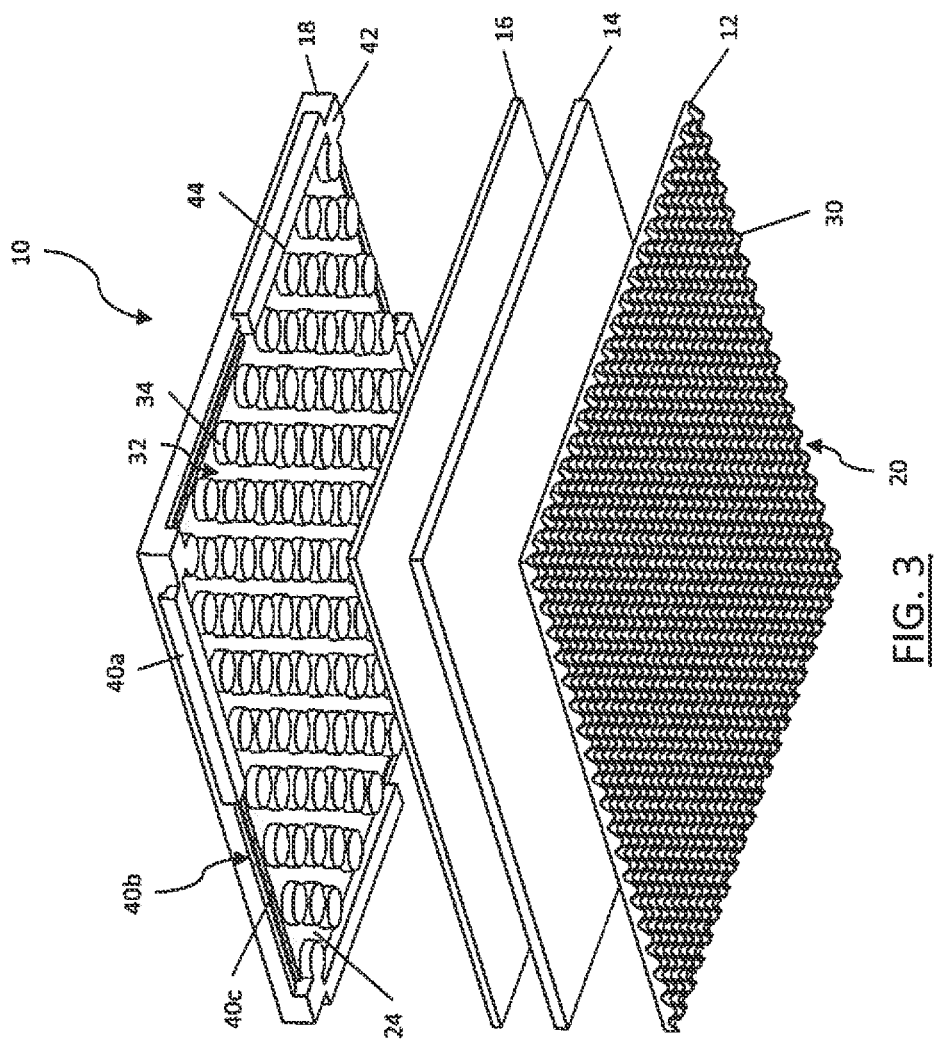
FIG. 3 is an exploded axonometric view of the impact damping mat of FIG. 1, viewed from below.

Turning to FIGS. 1 to 3, an embodiment of an impact damping mat is shown and generally identified by reference character 10. The impact damping mat 10 is intended to be placed on a horizontal surface such as a finished floor, subfloor or underfloor surface.

The impact damping mat 10 is made up of a stack of layers. In this embodiment, the stack of layers comprises a base layer 12, a damping layer 14, a load distribution layer 16 and an upper layer 18. The materials and dimensions of the base layer 12, the damping layer 14, the load distribution layer 16 and the upper layer 18 cooperate to provide the impact damping mat 10 with a selected rebound characteristic and a selected sound reduction characteristic. All of the layers of the impact damping mat 10 are secured together with an adhesive (not shown), such as a silane polymer-based adhesive.

As can be seen in FIGS. 1 to 3, the base layer 12 has a contoured bottom or base surface 20 with a plurality of protuberances 30, an opposite planar top surface and planar side surfaces. The protuberances 30 on the base surface 20 form an array of peaks 36 and valleys 38. The damping layer 14 overlies the top surface of the base layer 12 and has planar top, bottom and side surfaces. The load distribution layer 16 overlies the top surface of the damping layer 14 and similarly has planar top, bottom and side surfaces. The upper layer 18 overlies the top surface of the load distribution layer 16 and has a planar top surface 22, a recessed undersurface 24 from which a plurality of impact pedestals 34 depend, side walls 44 and corner supports 42. As will be appreciated by a person skilled in the art, planar means a surface that is flat or basically flat. In the case of at least the planar top surface 22, planar may include a textured surface, for example, to improve grip for a person walking on the impact damping mat 10.

The impact pedestals 34 depending from the undersurface 24 are cylindrical and contact the load distribution layer 16 to space the undersurface 24 of the upper layer 18 apart from the load distribution layer 16, thereby defining an interstitial void 32 between the upper layer 18 and the load distribution layer 16.

The upper layer 18 also includes a number of interlocking features to enable the impact damping mat 10 to engage one or more adjacent mats, which may have the same, similar or different properties to the impact damping mat 10. In the embodiment of FIGS. 1 to 3, each side of the upper layer 18 includes a plurality of interlocking features. Each interlocking feature comprises an L-shaped protrusion 40a extending outwardly from a side wall 44 of the upper layer 18, a gap 40b in the side wall 44 adjacent the protrusion 40a and a detent 40c in the recessed undersurface 24 adjacent the gap 40b and extending the length of the gap 40b. Each protrusion 40a is adapted to pass through a gap in a side wall of an adjacent mat and engage a detent of that adjacent mat.

In the embodiment of FIGS. 1 to 3, the base layer 12, the load distribution layer 16 and the upper layer 18 are formed of rubber, while the damping layer 14 is formed of a polyether urethane material. More specifically, the base layer 12 is formed of rubber with a thickness of $11/16"$ (~17 mm) and a weight of 203 lbs per 120 ft$^2$. The damping layer 14 is formed of polyether urethane material with a thickness of $\frac{1}{2}"$ (~13 mm) and a weight of 0.76 lbs per 1 ft$^2$ (0.155 kg per 1 m$^2$). The load distribution layer 16 is formed of rubber with a thickness of $5/16"$ (~8 mm) and a volumetric weight (or density) of approximately 66 lbs/ft$^3$ (1 057 kg/m$^3$). The upper layer 18 is formed of rubber with a thickness of $1\frac{1}{4}"$ (~32 mm) and a weight of 22.7 lbs per 3.9375 ft$^2$.

As discussed above, the materials and dimensions of the base layer 12, the damping layer 14, the load distribution layer 16 and the upper layer 18 cooperate to provide the impact damping mat 10 with a selected rebound characteristic and a selected sound reduction characteristic. As will be understood by a person skilled in the art, altering the materials and/or dimensions of these layers and/or altering the shape of the protuberances 30, the impact pedestals 34 and the interstitial void 32 may alter the rebound and sound reduction characteristics of the impact damping mat 10 and may facilitate with providing the selected rebound and sound reduction characteristics of the impact damping mat 10.

In this embodiment, the selected rebound characteristic of the impact damping mat 10 is a coefficient of restitution no greater than 30% when a 15 lb bowling ball (for example an undrilled TZone® Indigo Swirl, as sold by Brunswick®) is dropped from a height of 1.0 meters above and onto the planar top surface 22, as per ASTM F2117, and the selected sound reduction characteristic of the impact damping mat 10 is a reduction of the maximum sound level ($L_{Fmx}$) of at least 5 dB from 40 Hz to 63 Hz 1/3 octave bands and at least 13 dB at and above 80 Hz 1/3 octave bands normalized to a conventional ⅜" rollout rubber flooring product (for example GenieMat™ FIT08, as sold by Pliteq™) when a 15 lb bowling ball (for example an undrilled TZone® Indigo Swirl, as sold by Brunswick®) is dropped from a height of 1.0 meters above and onto the planar top surface 22.

Each of the layers of the impact damping mat 10 may contribute, at least partially, to providing the selected rebound and sound reduction characteristics. That said, the primary purpose of each of the layers is considered to be as follows: the primary purpose of the base layer 12 is to provide the selected sound reduction characteristic; the primary purpose of the damping layer 14 is to provide the selected rebound reduction characteristic; the primary purpose of the load distribution layer 16 is to distribute repetitive high-impact forces and protect the damping layer 14; and the primary purpose of the upper layer 18 is to provide durability to the impact damping mat 10. A person skilled in the art will understand that the layers of the impact damping mat 10 may help to serve other purposes, including other primary purposes, and the above list should not be read restrictively.

It has been found that the impact pedestals 34 may damage the damping layer 14 when the load distribution layer 16 is not provided. For example, without the load distribution layer 16, the impact pedestals 34 may punch disks out of the damping layer 14 in a cookie-cutter-like fashion as repetitive high-impact forces are applied to the impact damping mat 10 and transmitted through the impact pedestals 34. In embodiments where the damping layer 14 is susceptible to such damage, providing the load distribution layer 16 helps to distribute these repetitive high-impact forces and protect the damping layer 14. It will be appreciated that in embodiments where the damping layer 14 is sufficiently resilient to withstand the repetitive high-impact forces (which may include embodiments where the impact pedestals 34 are omitted or designed to minimize damage to the damping layer 14, for example by rounding the bottoms of the impact pedestals 34), it may be possible to omit the load distribution layer 16.

In use, typically, a plurality of impact damping mats 10 are placed contiguously over a horizontal surface to span an area. As will be appreciated, the size of this area will depend on the intended use of the impact damping mats 10. When placed contiguously, the interlocking features may assist with maintaining the positions of the impact damping mats 10 relative to one another. While this is the typical intended use of the impact damping mat 10, a person skilled in the art will appreciate that alternative embodiments are also possible. For example, in some embodiments a single impact damping mat 10 may be used in isolation, or a plurality of impact damping mats 10 may be placed interspersedly rather than contiguously. In some embodiments, the impact damping mats 10 may be used in conjunction with a particular piece of equipment, as will now be described.

Figure 4:
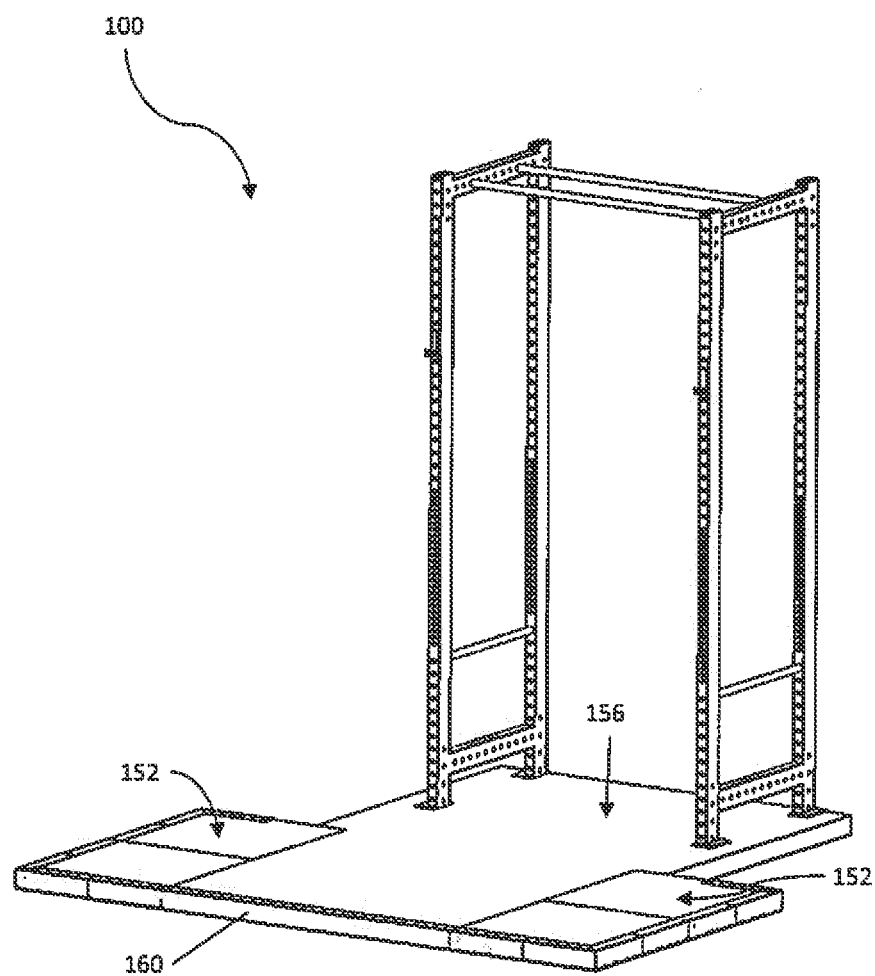
FIG. 4 is an axonometric view of an equipment accessory for use with adjacent equipment.
Figure 5:
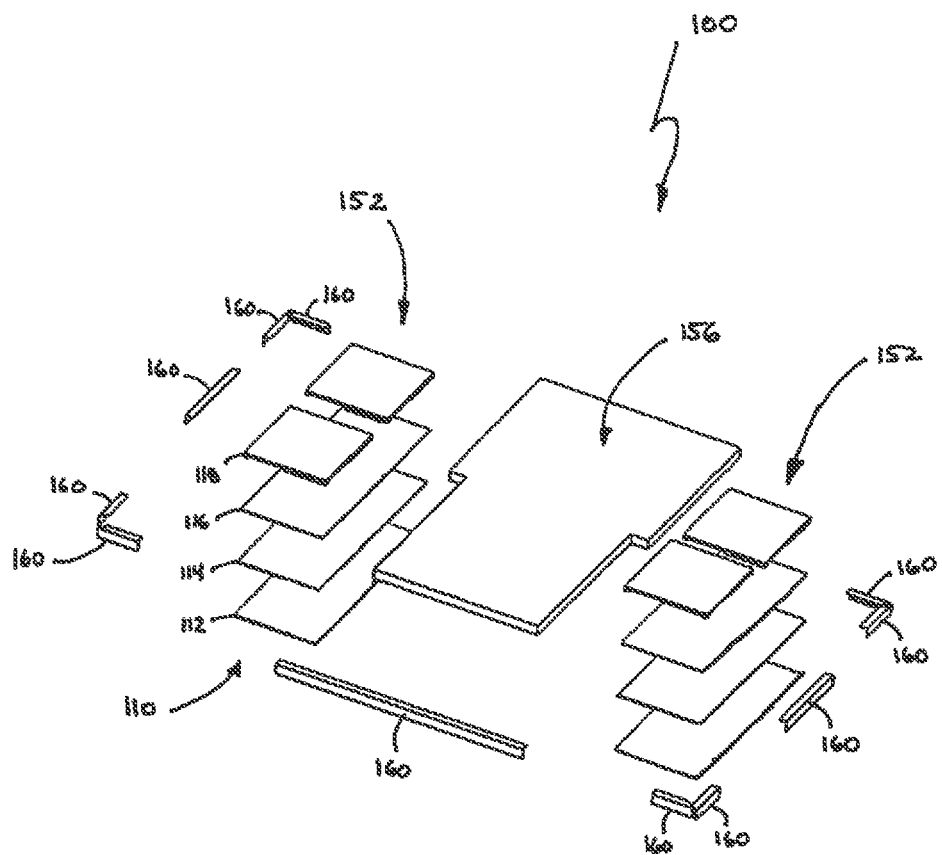
FIG. 5 is an exploded axonometric view of the equipment accessory of FIG. 4, viewed from above with the adjacent equipment omitted.

Turning to FIGS. 4 and 5, an equipment accessory is shown and generally identified by reference character 100. The equipment accessory 100 is intended to be used in conjunction with adjacent equipment such as a raised platform, a weight machine (such as a selectorized machine), weight bench, weight rack, smith machine, a cardio machine (such as a rowing machine, elliptical, treadmill, stationary bicycle or the like) or other fitness equipment. In this embodiment, the adjacent equipment is a power rack, as shown in FIG. 4.

In this embodiment, the equipment accessory 100 comprises two impact damping zones 152, a less damped zone 156 between the two impact damping zones 152 and a frame 160.

The less damped zone 156 is shaped to be secured to the adjacent equipment, which may help to keep the equipment accessory 100 in proximity to the adjacent equipment during high-impact activities and may facilitate incorporating the equipment accessory 100 in locations with limited floor space.

Each impact damping zone 152 is made up of four layers similar to those previously described for the impact damping mat 10, which are secured together with adhesive and provide rebound and sound reduction characteristics similar to those previously described. However, as can be seen in FIG. 5, in each impact damping zone 152, the bottom three layers (the base layer 112, the damping layer 114 and the load distribution layer 116) are each provided as a single elongate and continuous strip or run, while the upper layer 118 is provided as two side-by-side pieces or tiles. Each tile is identical to the upper layer 18 previously described, except insofar as the L-shaped protrusions are omitted from the sides of each tile adjoining/abutting the frame 160 and the less damped zone 156.

The frame 160 surrounds at least part of the two impact damping zones 152 and the less damped zone 156. As can be seen in FIG. 4, in this embodiment, the frame 160 does not completely surround the equipment accessory 100 and so portions of the sides of the less damped zone 156 and the impact damping zones 152 are uncovered. The frame 160 may provide a pleasing appearance for the equipment accessory 100, may help to conceal the various layers of the impact damping zones 152, may help to prevent dust and debris from entering the interstitial voids of the impact damping zones 152 and/or may assist with maintaining the positions of the impact damping zones 152, the less damped zone 156 and/or the adjacent equipment relative to one another. In other embodiments, the frame 160 may surround the entire periphery of the equipment accessory 100 or may be omitted altogether. As described above, the impact damping zones 152 of the equipment accessory 100 provide selected rebound characteristic and selected sound reduction characteristic similar to those as previously described for the impact damping mat 10. While these characteristics may be desirable for reducing the rebound, sound and vibration generated by the high-impact activity for which the equipment accessory 100 is intended to be used, these characteristics may be less desirable for a person standing and performing the high-impact activity. For example, the impact damping zones 152 may be softer and/or less stable than conventional ⅜" rollout rubber flooring product, described above. For at least this reason, the less damped zone 156 provides a different selected rebound characteristic and a different selected sound reduction characteristic from the impact damping zones 152. In the embodiment of FIGS. 4 and 5, the less damped zone 156 is formed of wood and is stiffer than the impact damping zones 152, which may provide increased stability.

Overall, the intent is that a person lifting a weight (such as a barbell with a weight plate on either end from the adjacent power rack) would stand on the less damped zone 156 during lifting and drop their weight on the impact damping zones 152 when done lifting, i.e. a weight plate would land on each impact damping zone 152. Accordingly, the less damped zone 156 is located where a person is likely to stand during lifting and the impact damping zones 152 are located on either side of the less damped zone 156, where the weights are likely to land.

Although it has been previously described that a plurality of discrete impact damping mats 10 may be placed contiguously to cover a large horizontal surface, alternative configurations for covering large horizontal surfaces are also possible, as will now be described.

Figure 6:
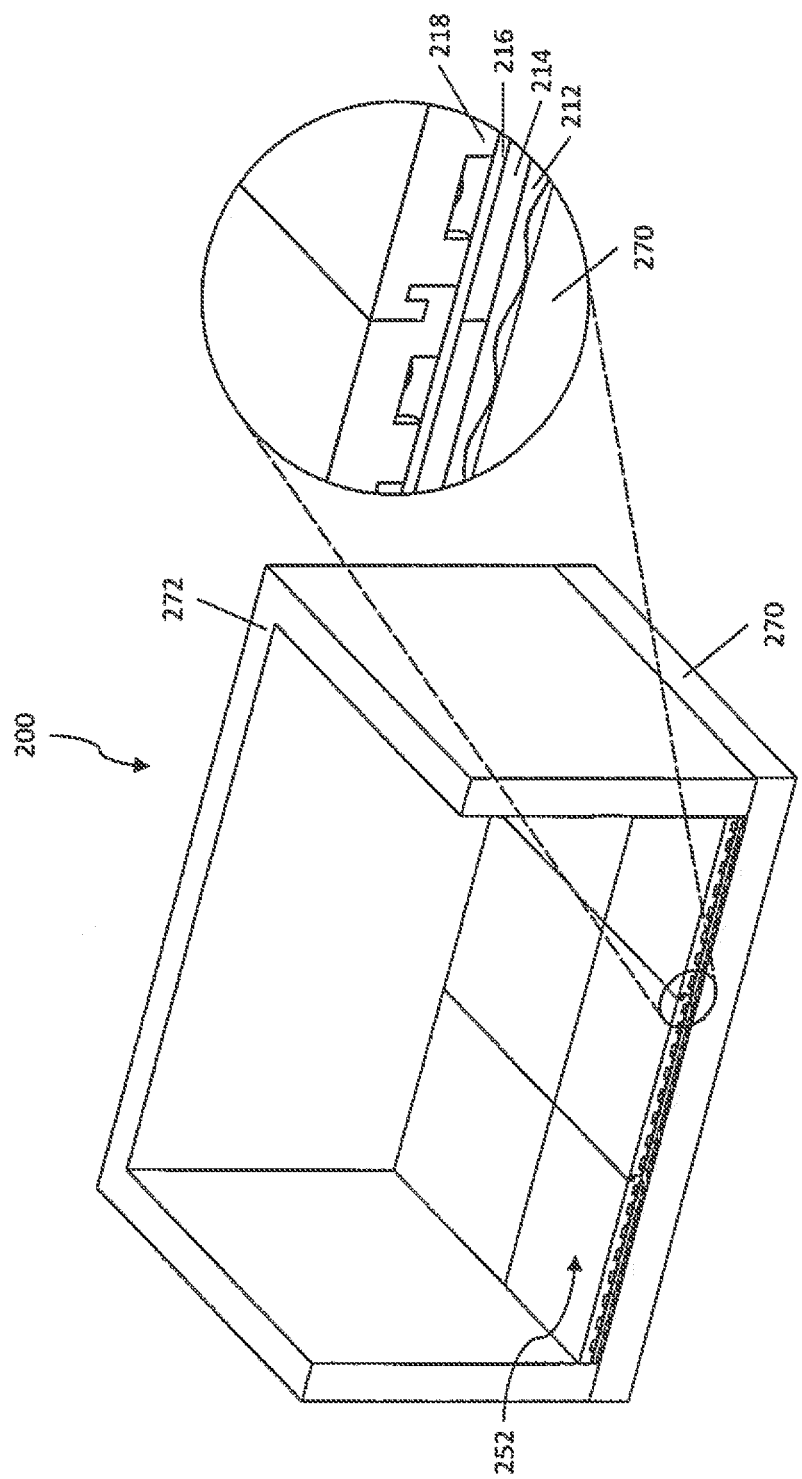
FIG. 6 is a section view of a flooring system, with an enlarged detail of an interface in the flooring system.
Figure 7:
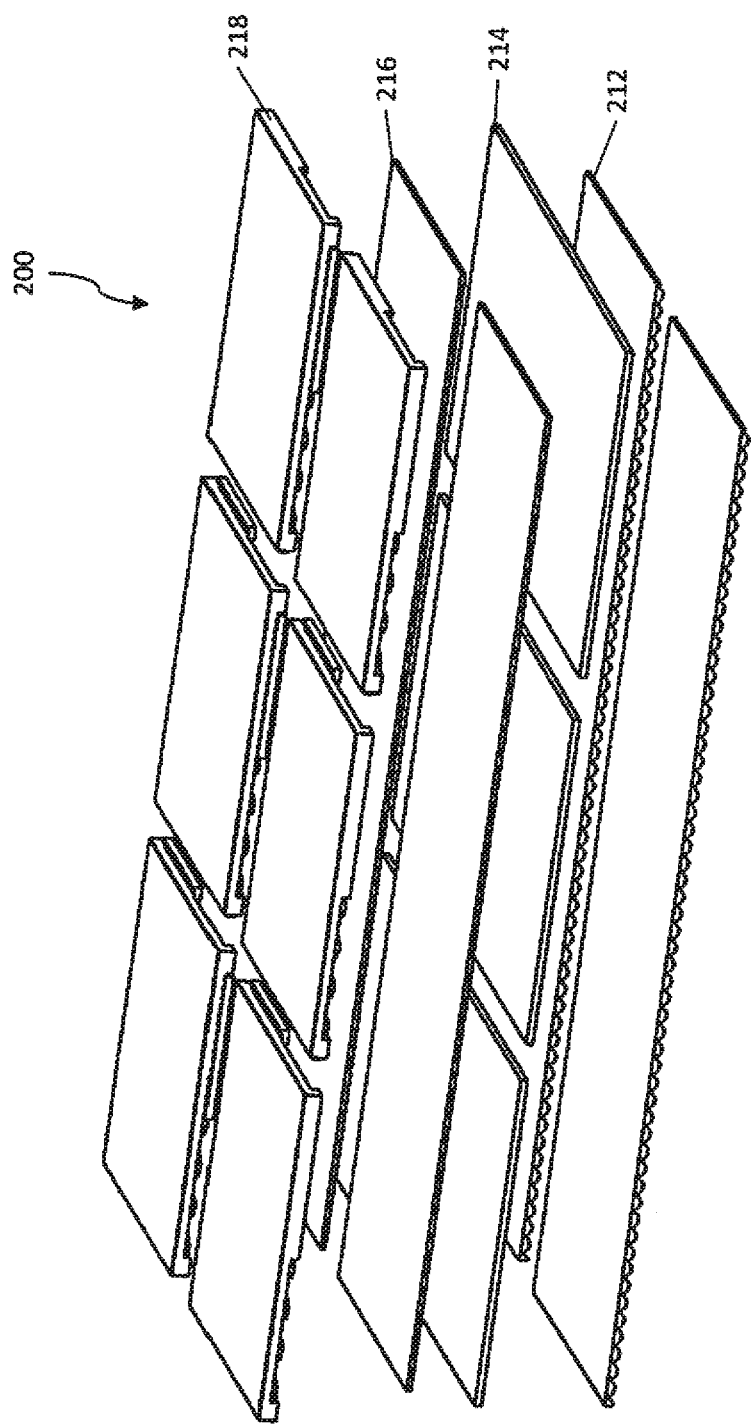
FIG. 7 is an exploded axonometric view of the flooring system of FIG. 6, with the wall and floor omitted.

Turning to FIGS. 6 and 7, an embodiment of a flooring system is shown and generally identified by reference character 200. Similar to the equipment accessory 100, described above, the flooring system 200 comprises an impact damping zone 252. The impact damping zone 252 covers an entire exposed horizontal surface of a floor 270, such as a finished floor, subfloor or underfloor surface and is bounded by a wall 272.

The impact damping zone 252 is made up of four layers similar to those previously described in the impact damping zone 152, which are secured together with adhesive and provide rebound and sound reduction characteristics similar to those as previously described. However, each of the layers in the impact damping zone 252 comprises a greater number of runs or tiles, which are placed contiguously to accommodate covering the larger horizontal surface of the floor 270. Additionally, as can be seen in FIG. 7, the runs of alternate layers in the bottom three layers (the base layer 212, the damping layer 214 and the load distribution layer 216) are perpendicular (or nearly perpendicular) to one another to avoid large seams in the flooring system 200. The L-shaped protrusions on the tiles of the upper layer 218 are only omitted from the sides of the tiles abutting the wall 272.

As can be seen in FIG. 7, sides of adjacent tiles in the upper layer 218 comprise the same interlocking features previously described for impact damping mat 10. As will be appreciated, the interlocking features may assist with maintaining the position of the tiles relative to one another in the flooring system 200.

Although the layers 212, 214, 216, 218 of the flooring system 200 have been described as covering the entire exposed horizontal surface of floor 270, a person skilled in the art will appreciate that in other embodiments these layers 212, 214, 216, 218 may only cover a portion of the horizontal surface or a plurality of discrete portions of the horizontal surface. The extent of the horizontal surface covered by the layers 212, 214, 216, 218 defines the impact damping zone 252, or zones 252 (when a plurality of discrete portions are covered), of the flooring system 200. Thus, the flooring system 200 may comprise one impact damping zone 252, as shown in the embodiment of FIGS. 6 and 7, or a plurality of discrete impact damping zones 252, in other embodiments.

Additionally, in some embodiments, the flooring system 200 may further comprise at least one or a plurality of less damped zones located adjacent the impact damping zone or zones 252. These less damped zone or zones provide a different selected rebound characteristic and a different selected sound reduction characteristic than the impact damping zone or zones 252, and in some embodiments may be the same as the less damped zone 156, previously described. It will be appreciated that a variety of layouts for the zones of the flooring system 200 are possible. For example, each impact damping zone 252 may be surrounded by a less damped zone, or vice versa. Alternatively, a plurality of less damped zones may be interspersed with a plurality of impact damping zones 252. The layout of the zones will depend on the intended use of the flooring system 200 and the surrounding environment. In this way, the flooring system 200 may provide a variety of characteristics selected to suit the needs of each zone.

Figure 8:
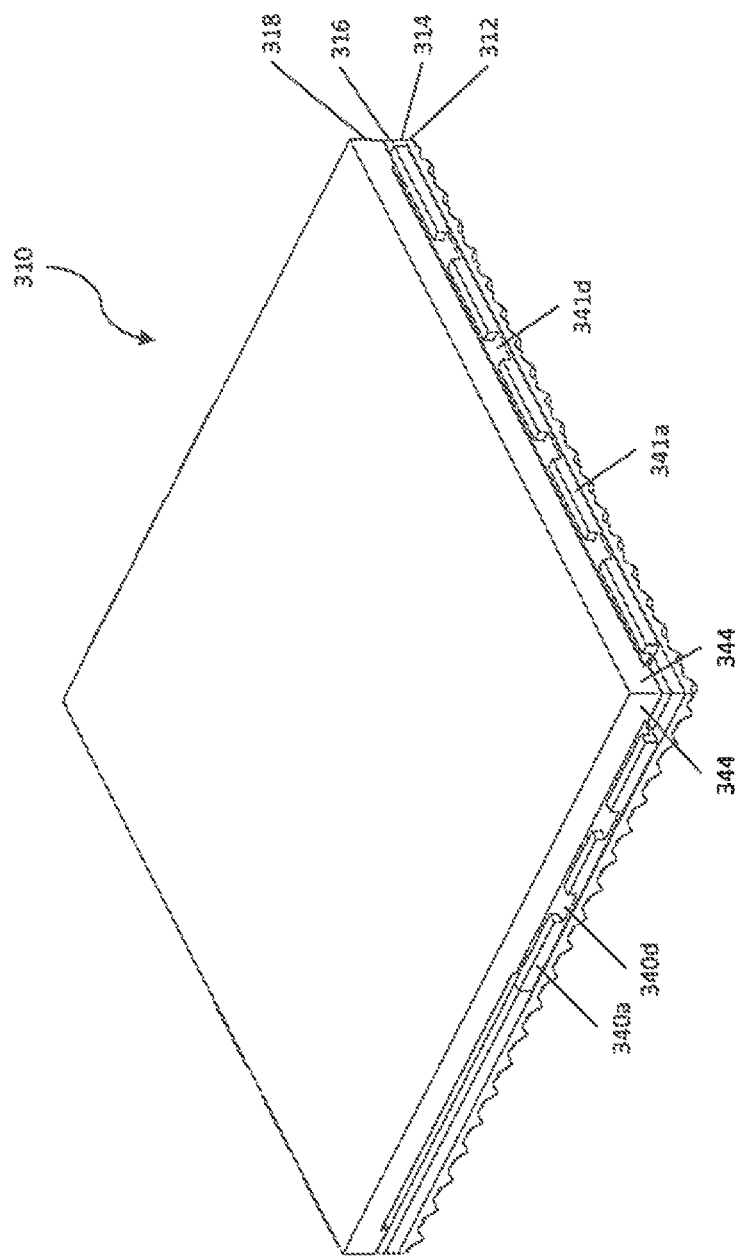
FIG. 8 is an axonometric view of another embodiment of an impact damping mat.

Turning to FIG. 8, another embodiment of an impact damping mat is shown and generally identified by reference character 310. The impact damping mat is intended to be placed on a horizontal surface, such as a finished floor, a subfloor or an underfloor surface, and is intended to be placed next to a less damped zone (such as a wood floor). The impact damping mat 310 is the same as the impact damping mat 10, described above, except for the interlocking features as will be described below.

The impact damping mat 310 comprises a plurality of layers arranged in a stacked formation. The layers comprise a base layer 312, a damping layer 314, a load distribution layer 316 and an upper layer 318. All of the layers of the impact damping mat 310 are secured together with an adhesive (not shown), such as a silane polymer-based adhesive. The materials and thicknesses of the base layer 312, the damping layer 314, the load distribution layer 316 and the upper layer 318 cooperate to provide the impact damping mat 310 with a selected rebound characteristic and a selected sound reduction characteristic.

The materials and thicknesses of the base layer 312, the damping layer 314, the load distribution layer 316 and the upper layer 318 are the same as those of the base layer 12, the damping layer 14, the load distribution layer 16 and the upper layer 18, respectively, of the impact damping mat 10, described above. Accordingly, the selected rebound characteristic and the selected sound reduction characteristic of the impact damping mat 310 are the same as those of the impact damping mat 10, described above.

As mentioned, the impact damping mat 310 is intended to be placed next to a less damped zone. The less damped zone provides a different selected rebound characteristic and a different selected sound reduction characteristic than the impact damping mat 310. In some embodiments, the less damped zone may be stiffer than the impact damping mat 310. In some embodiments, the less damped zone may be formed of wood and/or may be flooring, such as wood flooring, vinyl flooring, laminate flooring, tile flooring or other types of flooring. As will be appreciated, a plurality of the impact damping mats 310 may be placed continuously over a horizontal surface to span an area next to the less damped zone.

When one or more of the impact damping mats 310 are placed next to the less damped zone and subjected to repeated impacts over time, the upper layer 318 of the impact damping mat 310 may become separated (either completely or partially) from the underlying layers in the mat 310. As a result, when the impact damping mat 310 compresses under the force of an impact and then re-expands, the upper layer 318 may bounce up and catch on an adjacent edge of the less damped zone, above the level of the top surface of the less damped zone. The resulting uneven surface can be unsightly and may create a tripping hazard. Providing an elongated interlocking feature on the upper layer 318 of the impact damping mat 310 may reduce this bouncing up and catching action from happening.

As shown in FIG. 8, the upper layer 318 includes a number of interlocking features. The interlocking features on three sides of the upper layer 318 are configured to engage adjacent mats and are similar to the interlocking features described above for the upper layer 18 of the impact damping mat 10, except the L-shaped protrusion 340a on mat 310 that extends outwardly from the side wall 344 of the upper layer 318 defines a plurality of crenels 340d. On the remaining side of the upper layer 318, the interlocking feature is configured to engage an adjacent less damped zone. The interlocking feature on the one side of the upper layer 318 comprises an elongated L-shaped protrusion 341*a* that extends outwardly from a respective side wall 344 of the upper layer 318 and generally runs the entire length of the respective side wall 344. Similar to the L-shaped protrusions 340*a* described above, the elongated L-shaped protrusion 341*a* defines a plurality of crenels 341*d*. The elongated L-shaped protrusion 341*a* is configured to be received in a recess in the adjacent less damped zone, to secure the upper layer 318 of the impact damping mat 310 to the adjacent less damped zone.

As will be appreciated, when the elongated L-shaped protrusion 341*a* is secured to the adjacent less damped zone, the elongated protrusion 341*a* may help to resist the upper layer 318 from bouncing up and catching on the edge of the adjacent less damped zone, above the level of the top surface of the adjacent less damped zone. Additionally, because the elongated protrusion 341*a* generally runs the entire length of the respective side wall 344, the elongated protrusion 341*a* may help to resist the upper layer 318 from bouncing up and catching along generally the entire width of the impact damping mat 310 that abuts the adjacent less damped zone. As will be appreciated, since the elongated protrusion 341*a* is longer than the protrusions 340*a* described above, the elongated protrusion 341*a* may better resist this bouncing up and catching action of the upper layer 318 of the impact damping mat 310 described above.

Although the elongated L-shaped protrusion 341*a* is shown and described as generally running the entire length of the respective side wall 344 of the upper layer 318, it will be appreciated that in other embodiments the elongated protrusion 341*a* may run along a majority of the length of the respective side wall 344 of the upper layer 318, such as at least 50 percent of the respective side wall length or at least 75 percent of the respective side wall length. In some embodiments, the elongated protrusion 341*a* may comprise a plurality of protrusions that are spaced along the aforementioned width of the respective side wall 344.

Although the elongated protrusion 341*a* is shown and described as extending from one of the side walls 344 of the upper layer 318 of the impact damping mat 310, it will be appreciated that in other embodiments the impact damping mat 310 may include a plurality of elongated protrusions 341*a*, each extending from a respective side wall 344 of the upper layer 318. A plurality of elongated protrusions 341*a* may be included in embodiments where the impact damping mat 310 is configured to abut a less damping zone or zones on a plurality of sides of the impact damping mat 310.

Although the elongated protrusion 341*a* is shown and described as being L-shaped, it will be appreciated that in other embodiments the elongated protrusion 341*a* may be a different shape that is configured to engage the adjacent less damped zone or zones, for example the elongated protrusion may be channel-shaped, tab-shaped or another suitable shape for engaging the adjacent less damped zone.

Figure 9:
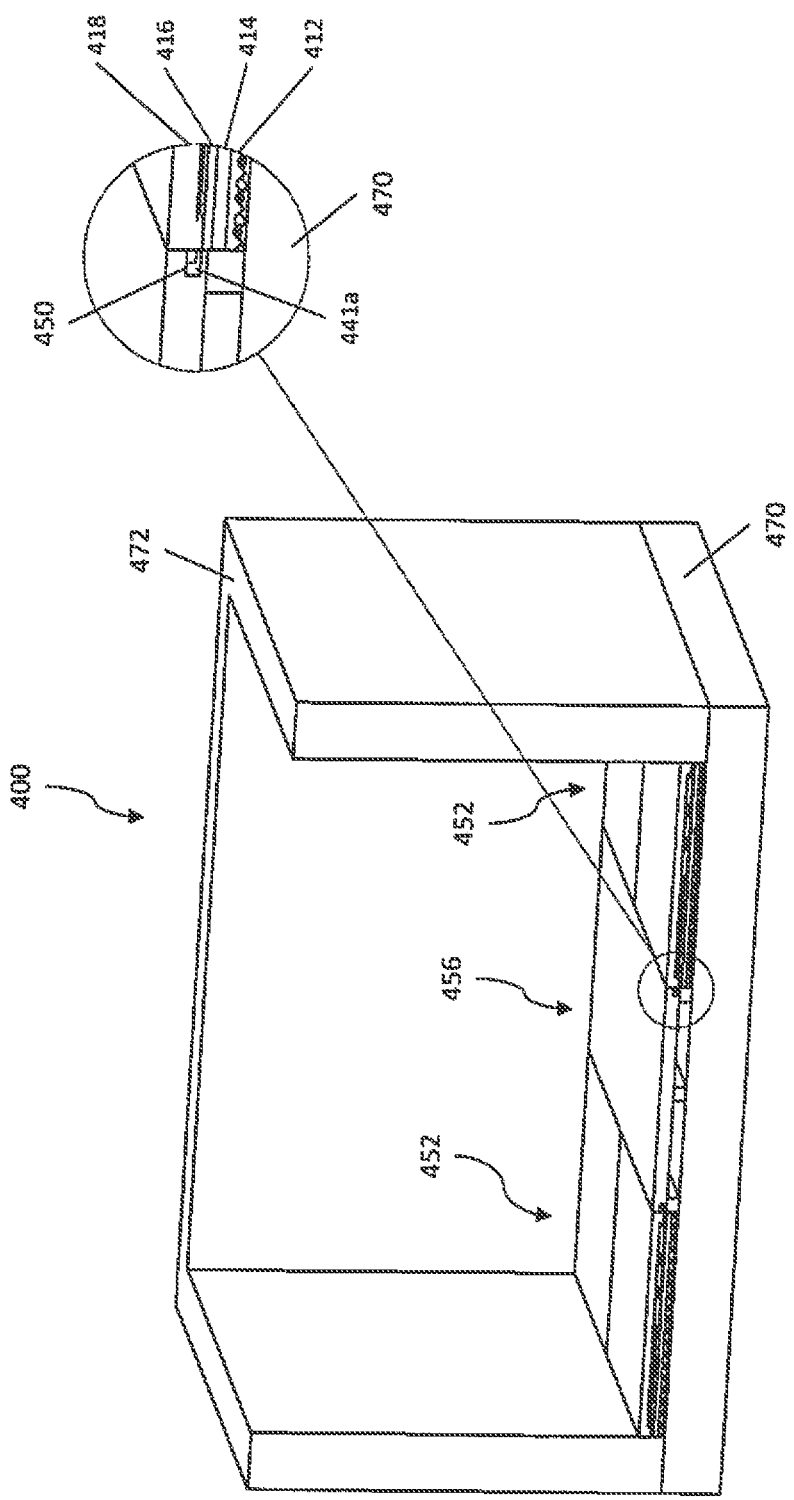
FIG. 9 is a section view of another embodiment of a flooring system, with an enlarged detail of an interface in the flooring system.

Turning to FIG. 9, another embodiment of a flooring system is shown and generally identified by reference character 400. The flooring system 400 comprises a plurality of impact damping zones 452 and a less damped zone 456 adjacent thereto. The flooring system 400 covers a horizontal surface of a floor 470, such as a subfloor or an underfloor surface, and is bounded by a wall 472. Each of the impact damping zones 452 is similar to the impact damping zone 252 described above, except for the interlocking features on the sides that abut the less damped zone 456 as will be described below.

Each of the impact damping zones 452 comprises a plurality of layers arranged in a stacked formation. The layers comprise a base layer 412, a damping layer 414, a load distribution layer 416 and an upper layer 418. All of the layers are secured together with an adhesive (not shown), such as a silane polymer-based adhesive. The base layer 412, the damping layer 414 and the load distribution layer 416 are the same as the base layer 212, the damping layer 214 and the load distribution layer 216, respectively, of the impact damping zone 252 of the flooring system 200 described above. The upper layer 418 is the same as the upper layer 218 of the impact dampening zone 252 described above, except for the interlocking features on the sides of tiles that abut the less damped zone 456. On the sides of the tiles in the upper layer 418 that abut the less damped zone 456, the interlocking features comprise one or more elongated protrusions 441*a*, which are each the same as the elongated protrusion 341*a* of the upper layer 318 in the impact damping mat 310, described above.

The materials and thicknesses of the base layer 412, the damping layer 414, the load distribution layer 416 and the upper layer 418 cooperate to provide the flooring system 400 with a selected rebound characteristic and a selected sound reduction characteristic. The materials and thicknesses of the base layer 412, the damping layer 414, the load distribution layer 416 and the upper layer 418 are the same as those of the base layer 212, the damping layer 214, the load distribution layer 216 and the upper layer 218, respectively, of the impact damping zone 252, described above. Accordingly, the selected rebound characteristic and the selected sound reduction characteristic of each of the impact damping zones 452 are the same as those of the impact damping zone 252, described above.

The less damped zone 456 provides a different selected rebound characteristic and a different selected sound reduction characteristic than the impact damping zone 452. In some embodiments, the less damped zone 456 may be stiffer than the impact damping zones 452. In some embodiments, the less damped zone 456 may be formed of wood and/or may be flooring, such as wood flooring, vinyl flooring, laminate flooring, tile flooring or other types of flooring. As shown in the enlarged detail in FIG. 9, a recess 450 is formed in a peripheral edge of the less damped zone 456 for receiving the elongated protrusion 441*a* of an adjacent impact damping zone 452, to secure the upper layer 418 of the adjacent impact damping zone 452 to the less damped zone 456. As will be appreciated, when the elongated protrusion 441*a* is secured in the recess 450 of the less damped zone 456, the elongated protrusion 441*a* may help to resist the upper layer 418 from bouncing up and catching on the edge of the adjacent less damped zone 456, above the level of the top surface of the adjacent less damped zone 456.

Although a single less damped zone 456 is shown and described between two impact damping zones 452, it will be appreciated that in other embodiments the flooring system 400 may comprise at least one or a plurality of the less damped zones 456 located adjacent at least one or a plurality of the impact damping zones 452. It will be appreciated that a variety of layouts for the zones of the flooring system 400 are possible. For example, each impact damping zone 452 may be surrounded by a continuous less damped zone 456, or vice versa. Alternatively, a plurality of the less damped zones 456 may be interspersed with a plurality of the impact damping zones 452. The layout of the zones will depend on the intended use of the flooring system 400 and the surrounding environment. Additionally, the selected rebound characteristics and the selected sound reduction characteristics of the impact damping zones 452 may all be the same or may vary. In this way, the flooring system 400 may provide a variety of characteristics selected to suit the needs of each zone.

In one or more of the embodiments discussed above, the adhesive may be a one-component, 100% solids, cross-linking, modified silane polymer-based adhesive. This adhesive may be solvent-free, water-free, and isocyanate-free, non-flammable, have low-odor, negligible VOC content and contain no hazardous chemicals as per OSHA Regulation CFR 1910.1200. This adhesive may be a Class 1 vapor barrier, feature extremely low-permeability ratings, withstand maximum moisture levels of 10 lbs and 90% RH and may be unaffected by concrete slab alkalinity, have good early strength buildup for immediate grab which gradually builds into a tenacious but resilient bond as the chemicals in the adhesive cross-link. This adhesive may also have plasticizer migration resistance that allows installation of a broad variety of vinyl floor products.

In one or more of the embodiments discussed above, the base layer may be formed of a material with substantially the following properties: at least 80% recycled rubber, sheet weight of 1.9 lbs/ft$^2$ (9.28 kg/m$^2$), tensile strength per ASTM D412 Die C of 35 psi minimum, elongation at break per ASTM D412 Die C of 60% minimum, compressibility per ASTM F36 @ 50 psi=15%/recovery 85% minimum and @ 100 psi=20%/recovery 85% minimum, type A hardness per ASTM D2240 of 30 durometer, and temperature stability between −40° C. to +115° C. (~−40° F. to +240° F.). In some embodiments, the base layer may have a thickness of $^{11}/_{16}$" (~17 mm) and a weight of 203 lbs per 120 ft$^2$. In some embodiments, the base layer may have a thickness of 0" to 1" (~0 mm to 25 mm), inclusive; as will be appreciated, in embodiments where the base layer has a thickness of 0" (0 mm), the base layer is omitted.

In one or more of the embodiments discussed above, the damping layer may be formed of a highly damped compound such as a microcellular polyether urethane material with substantially the following properties: rubber deterioration/air oven per ASTM D573 of no deterioration, freeze thaw per ASTM C67 of no deterioration, abrasion resistance per ASTM C501 of 77, slip resistance per ASTM E303 of 63 dry and 72.25 wet, slip resistance per ASTM D2047 of 0.601, elongation at break per ASTM D412 of 35.3% and pass a flammability test per ASTM D2859. In some embodiments, the damping layer may have a thickness of ½" (~13 mm) and a weight of 0.76 lbs per 1 ft$^2$ (0.155 kg per 1 m$^2$). In some embodiments, the damping layer may have a thickness of ¼" to 1½" (~6 mm to 38 mm), inclusive.

In one or more of the embodiments discussed above, the load distribution layer may be formed of a material with substantially the following properties: wear hardness per DIN 53577 of approximately 4.0 MPa, Shore A hardness per DIN 53505 of 60 (+/−5), compression set per DIN 53517 of approximately 15%, abrasion per DIN 53516 of maximum 200 mm$^3$, tensile strength per EN ISO 1798 of approximately 1.5 N/mm$^2$, elongation at break per EN ISO 1798 of approximately 90%, coefficient of friction per EN 13893: 2002 of μ=0.47 (safe), fire resistance per DIN EN 13501-1 of $E_{fl}$ (B2), light fastness per DIN EN 105-B02:1999-09 of 2-3, electrostatic properties per DIN EN 1815:1995-06 of 0.5 kV, remaining deformation per EN 433:1994-11 of 0.13 mm and reduction of impact sound pressure level (ΔLw) per DIN EN ISO 140-8:1998-03 of 18 dB. In some embodiments, the load distribution layer may have a thickness of $^5/_{16}$" (~8 mm) and a volumetric weight (or density) of approximately 66 lbs/ft$^3$ (1 057 kg/m$^3$). In some embodiments, the load distribution layer may have a thickness of $^3/_{16}$" to $^7/_{16}$" (~5 mm to 11 mm), inclusive.

In one or more of the embodiments discussed above, the upper layer may be formed of a material with substantially the following properties: at least 80% recycled rubber, wear surface density (durability) of greater than 60 lbs/ft$^3$, acoustical IF09-002 per ASTM E2179 of Δ26 dB, acoustical A09-009 per ASTM EC423/E795 of SAA=0.14 and NRC 0.15, rubber deterioration/air oven per ASTM D573 of no deterioration, freeze thaw per ASTM C67 of no deterioration, slip resistance per ASTM E303 of 102 dry and 62 wet, slip resistance per ASTM D2047 of 0.81 dry and 0.82 wet, tensile strength per ASTM D412 of 107 psi, elongation at break per ASTM D412 of 165%, tear strength per ASTM D624 of 33.1 lbs/in, compression deflection per ASTM D1667 of 29.5 psi to 25% compression, compression set per ASTM D395 of 4.37% permanent set, flammability per ASTM E648 of Class 2, passing a flammability—burning pill test per ASTM D2859 and flammability—roof covering per ASTM E108 of Class A (premium). In some embodiments, the upper layer may have a thickness of 1¼" (~32 mm) and a weight of 22.7 lbs per 3.9375 ft$^2$. In some embodiments, the upper layer may have a thickness of 1" to 1½" (~25 mm to 38 mm), inclusive.

Although the embodiments herein are described as comprising four separate layers, a person skilled in the art will appreciate that in alternative embodiments there may be more or fewer layers which cooperate to provide the selected rebound characteristic and the selected sound reduction characteristic. For example, in some embodiments the load distribution layer may be omitted and the upper layer may be increased in thickness accordingly, to achieve the selected rebound characteristic and the selected sound reduction characteristic. In other embodiments, other layers may be omitted or increased or decreased in thickness.

Although thicknesses and weights of the layers in the embodiments herein have been described with particular measurements, a person skilled in the art will appreciate that these measurements are exemplary and that these measurements may be varied in some embodiments depending on the high-impact activity for which the embodiment is intended to be used.

Although the base layer, the load distribution layer and the upper layer in the embodiments herein have been described as being made of rubber or at least 80% recycled rubber, a person skilled in the art will appreciate that in some embodiments some or all of these layers may be formed of polyurethane, poly-ether urethane, natural rubber, styrene-butadiene rubber (SBR), at least 90% recycled rubber, fabric and/or polycarbonate.

Although the damping layer in the embodiments herein has been described as being made of a polyether urethane material, a person skilled in the art will appreciate that in some embodiments the damping layer may be formed of polyurethane, poly-ether urethane, natural rubber, SBR, fabric and/or polycarbonate.

Although the layers of the embodiments herein have been described as being secured together with a silane polymer-based adhesive, a person skilled in the art will appreciate that in some embodiments other adhesives or mechanisms for securing the layers together may be used. For example, in some embodiments such other adhesives may include hot adhesives and/or adhesives that are contact based, pressure sensitive based, 1-part and/or multi-part based, solvent based and/or polymer dispersion based, and such other mechanisms may include mechanical adhesion. In some embodiments, a plurality of the layers or none of the layers may be secured together with an adhesive. For example, none of the layers may be secured together in embodiments where the weight of the layers and/or the environment surrounding the layers are sufficient to hold the layers in place during the high-impact activities for which the embodiment is intended to be used.

Although the base layer, the damping layer, the load distribution layer and the upper layer have been described in the embodiments herein as cooperating to provide the impact damping mat and impact damping zones with the selected rebound characteristic and the selected sound reduction characteristic, a person skilled in the art will appreciate that in some embodiments more or fewer layers may cooperate to provide the selected rebound characteristic and the selected sound reduction characteristic. For example, in embodiments where the impact damping mat or impact damping zones comprise additional layers, all of the layers may cooperate to provide the selected rebound characteristic and the selected sound reduction characteristic. Conversely, in embodiments where the impact damping mat or impact damping zones comprise fewer layers (for example, where the load distribution layer is omitted) the remaining layers may cooperate to provide the selected rebound characteristic and the selected sound reduction characteristic. A person skilled in the art will appreciate that all of the layers and features of an embodiment may contribute at least partially to the rebound and sound reduction characteristics. Consequently, what layers and features provide the selected rebound characteristic and the selected sound reduction characteristics should not be read restrictively.

Although the coefficient of restitution in the embodiments described herein is selected to be no greater than 30% when a 15 lb bowling ball (for example an undrilled TZone® Indigo Swirl, as sold by Brunswick®) is dropped from a height of 1.0 meters above and onto the planar top surface as per ASTM F2117, a person skilled in the art will appreciate that this selected coefficient of restitution is for exemplary purposes only and that the selected coefficient of restitution may be varied in some embodiments depending on the high-impact activity for which the embodiment is intended to be used. A person skilled in the art will also appreciate that the coefficient of restitution may be measured with a mass other than a 15 lb bowling ball in some embodiments, which may vary the measurement.

Although the reduction of maximum sound level in the embodiments described herein is selected to be at least 5 dB from 40 Hz to 63 Hz 1/3 octave bands and at least 13 dB at and above 80 Hz 1/3 octave bands normalized to a conventional ⅜" rollout rubber flooring product (for example GenieMat™ FIT08, as sold by Pliteq™) when a 15 lb bowling ball (for example an undrilled TZone® Indigo Swirl, as sold by Brunswick®) is dropped from a height of 1.0 meters above and onto the planar top surface, a person skilled in the art will appreciate that this selected reduction of maximum sound level is for exemplary purposes only and the selected reduction of maximum sound level may be varied in some embodiments depending on the high-impact activity for which the embodiment is intended to be used. A person skilled in the art will also appreciate that the reduction of maximum sound level may be measured over other frequency ranges or with a mass other than a 15 lb bowling ball in some embodiments, which may vary the measurement.

Although the selected rebound characteristic and the selected sound reduction characteristic in the embodiments described herein are a coefficient of restitution and a reduction of maximum sound level, a person skilled in the art will appreciate that other characteristics may be selected in some embodiments. A person skilled in the art will appreciate that the selected rebound characteristic and the selected sound reduction characteristic will depend on the intended use of the impact damping mat, equipment accessory or flooring system. In embodiments where the objects involved in the high-impact activity are more likely to cause injury to nearby persons or damage nearby structure or equipment, the selected rebound characteristic may be a value that results in less rebound. Conversely, in embodiments where the objects involved in the high-impact activity are less likely to cause injury or damage, the selected rebound characteristic may be a value that results in more rebound. Similarly, in embodiments where sounds are more likely to negatively affect nearby persons, the selected sound reduction characteristic may be a value that results in less noise. Conversely, in embodiments where sounds are less likely to negatively affect nearby persons, the selected sound reduction characteristic may be a value that results in more noise.

Although the impact pedestals have been described as spacing the undersurface apart from the load distribution layer thereby defining a single interconnected interstitial void in the embodiments described herein, a person skilled in the art will appreciate that in some other embodiments these features may define a plurality of interstitial voids between the upper layer and the load distribution layer.

Although the impact pedestals are shown and described as cylindrical, a person skilled in the art will appreciate that in some embodiments the impact pedestals may be other shapes or configurations, for example, in some embodiments the impact pedestals may be conoid, polyhedronal, spherical caps, spherical segments, ellipsoidal caps, ellipsoidal segments and/or sinusoidal shaped. In some embodiments the impact pedestals may be hollow. In some embodiments the impact pedestals may be omitted and the undersurface of the upper layer may not be recessed and may be planar, similar to the bottom surfaces of damping layer and the load distribution layer as previously described. In such embodiments, the load distribution layer may be omitted from the impact damping mat.

Although the protuberances are shown and described as being shaped to define a sinusoidal array of peaks and valleys, a person skilled in the art will appreciate that in some embodiments the protuberances may be other shapes or configurations, for example, in some embodiments the protuberances may be conoid, cylindrical, polyhedronal, spherical caps, spherical segments, ellipsoidal caps and/or ellipsoidal segments. In some embodiments the protuberances may be hollow.

Although the interlocking features in some embodiments herein have been shown and described as comprising L-shaped protrusions, gaps and detents wherein each protrusion is adapted to pass through a gap in the side wall of an adjacent mat and engage a detent of that adjacent mat, a person skilled in the art will appreciate that in some embodiments the interlocking features may be adapted to engage other objects such as adjacent equipment, adjacent flooring and/or an adjacent structure. Further, a person skilled in the art will appreciate that in some embodiments the interlocking features may protrude from another layer or from a plurality of layers. For example, an interlocking feature may comprise a first portion extending from the upper layer and a second portion extending from the base layer which cooperate to engage an adjacent object. In some embodiments, the interlocking features may comprise one or a plurality of channel-shapes, crenulations, tabs, slots, protrusions, cut-outs, intrusions, indentations, detents and/or perforations. In some embodiments, the interlocking features may not be wholly located at the periphery of the impact damping mat or a tile thereof. For example, in some embodiments an interlocking feature may comprise a threaded rod which is secured at the periphery of the impact damping mat or tile and extends through the impact damping mat or tile.

Although the less damped zones in the embodiments herein have been described above as being stiffer than the impact damping zones, a person skilled in the art will appreciate that in some embodiments the less damped zone may provide other properties complimentary to their intended use. As will also be appreciated, in embodiments with a plurality of less damped zones, the less damped zones may provide the same or different properties from one another. For example, one or more of the less damped zones may provide increased stability to accommodate weight lifting, while one or more other less damped zones may be softer to accommodate stretching or other activities. Similarly, in embodiments with a plurality of impact damping zones, the impact damping zones may provide the same or different selected rebound characteristics and the same or different selected sound reduction characteristics from each other.

Although the less damped zone has been described above as being formed of wood, a person skilled in the art will appreciate that in other embodiments each less damped zone may be formed of other suitable materials such as polyurethane, poly-ether urethane, natural rubber, SBR, fabric, polycarbonate, plywood, gypsum concrete, lightweight concrete, normal weight concrete, oriented strand board, luon, cement board, paper board, gypsum board, particle board, plastic and/or metal.

Although the bottom three layers (the base layer, the damping layer and the load distribution layer) of the equipment accessory and the flooring system have each been described as being in the form of elongate and continuous strips or runs, a person skilled in the art will appreciate that each of these layers may take the form of a plurality of discrete side-by-side tiles, similar to the upper layer previously described. Likewise, while the upper layer has been described as being provided as a plurality of discrete side-by-side tiles, this layer may take the form of one or more elongate and continuous strips or runs, similar to the aforementioned bottom three layers.

Where a plurality of adjacent layers are provided in the form of tiles, one or more tiles from each of these layers may be secured together to form a pre-assembled multi-layer tile. Providing a plurality of layers as tiles and/or pre-assembled multi-layer tiles may facilitate installation, shipment and/or storage of these layers. It may be particularly desirable to provide a layer as a plurality of tiles where that layer is too stiff to be provided as runs that can be rolled up for shipment and/or storage.

Although the equipment accessory has been described above as comprising two impact damping zones and one less damped zone, a person skilled in the art will appreciate that in some embodiments the equipment accessory may comprise one impact damping zone or more than two impact damping zones. Similarly, in some embodiments the equipment accessory may comprise a plurality of less damped zones. As will be appreciated, the composition of the equipment accessory may vary depending on the high-impact activity and the adjacent equipment with which the equipment accessory is intended to be used. In some embodiments the adjacent equipment may not be fitness equipment and may be some other equipment associated with a high-impact activity which may take place in a mechanical room, healthcare facility, studio, school or the like.

Although the less damped zone has been described as being shaped to be secured to the adjacent equipment, in some embodiments, at least one or a plurality of the less damped zone, the frame and the impact damping zones may be shaped to be secured to the adjacent equipment. In some embodiments, at least one or a plurality of the frame, the less damped zone and the impact damping zones may comprise a fastening mechanism to secure the equipment accessory to the adjacent equipment. A person skilled in the art will appreciate that the equipment accessory, and the elements thereof, may be adapted to be secured to the adjacent equipment in a variety of ways depending on the adjacent equipment with which the equipment accessory is intended to be used. For example, in some embodiments the less damped zone of the equipment accessory may be shaped to pass between parts of the adjacent equipment and thereby be secured to the adjacent equipment.

Although the interlocking features have been described as omitting the L-shaped protrusion on the sides of the impact damping zones adjacent the frame and the less damped zone in the equipment accessory, a person skilled in the art will appreciate that the interlocking features may vary depending on the composition of the equipment accessory and the adjacent equipment with which the equipment accessory is intended to be used. In some embodiments, the interlocking features may be omitted or different than previously described on various sides of the impact damping zones, for example, in some embodiments the interlocking features on the sides of the impact damping zones adjacent the less damped zone may be adapted to engage the less damped zone, to assist with maintaining the position of the impact damping zones relative to the less damped zone.

Although the horizontal surface in the embodiments herein has been described as a finished floor, subfloor or underfloor surface, a person skilled in the art will appreciate that the impact damping mat, equipment accessory and flooring system described herein are adaptable and can overlie a variety of surfaces in a variety of embodiments. These surfaces may comprise a concrete slab or other materials, for example, plywood, gypsum concrete, lightweight concrete, normal weight concrete, oriented strand board, luon, cement board, paper board, gypsum board and/or particle board.

Although the embodiments of the impact damping mat, equipment accessory and flooring system have been described individually and separately, above, a person skilled in the art will appreciate that these embodiments are intentionally adaptable and should not be read as necessarily distinct. For example, in some embodiments a plurality of the impact damping mats may be placed contiguously to cover all or part of a horizontal surface such that the impact damping mats form a defacto flooring system. Similarly, in some embodiments, the flooring system may only cover a portion of a horizontal surface such that it forms a defacto impact damping mat and/or equipment accessory.

The impact damping mat, equipment accessory and/or flooring system described herein may be used in many environments. For example, the impact damping mat, equipment accessory and/or flooring system can be used to retrofit existing buildings or may be installed in a newly constructed building to mitigate rebound and noise generated from high-impact activities.

Embodiments of the impact damping mat, equipment accessory and flooring system have been described above, and with reference to the drawings for the impact damping mat and equipment accessory. Those of skill in the art will however appreciate that variations and modifications can be made without departing from the scope thereof as defined by the appended claims.

What is claimed is:

1. An impact damping mat comprising:
a plurality of layers arranged in a stacked formation, the stacked formation having a total thickness no greater than 4 and 7/16 inches and the plurality of layers cooperating to provide the impact damping mat with at least one of:
a coefficient of restitution no greater than 30%; and
a selected sound reduction characteristic, the selected sound reduction characteristic being a reduction of a maximum sound level of at least 5 dB from 40 to 63 Hz 1/3 octave bands and at least 13 dB at and above 80 Hz 1/3 octave bands normalized to 3/8 inch rollout rubber flooring.

2. The impact damping mat of claim 1, wherein the plurality of layers comprises a base layer, an intermediate layer and an upper layer.

3. The impact damping mat of claim 2, wherein the intermediate layer is a damping layer that is formed of a polyether urethane material, wherein the damping layer has a thickness of 1/4 of an inch to 1 and 1/2 inches, inclusive, and wherein the damping layer generally has a weight of less than 2.5 lbs per 1 ft².

4. The impact damping mat of claim 2, wherein the upper layer is formed of rubber and has a thickness of 1 inch to 1 and 1/2 inches, inclusive, and wherein the upper layer generally has a weight of less than 30 lbs per 4 ft².

5. The impact damping mat of claim 2, wherein the base layer is formed of rubber and has a thickness no greater than 1 inch and wherein the base layer generally has a weight of less than 300 lbs per 120 ft².

6. The impact damping mat of claim 2, wherein the plurality of layers further comprises a load distribution layer interposed between the intermediate layer and the upper layer.

7. The impact damping mat of claim 6, wherein the load distribution layer is formed of rubber and has a thickness of 3/16 of an inch to 7/16 of an inch, inclusive, and wherein the load distribution layer generally has a density of less than 70 lbs/ft³.

8. The impact damping mat of claim 1, wherein the plurality of layers cooperate to provide the impact damping mat with both the coefficient of restitution no greater than 30% and the selected sound reduction characteristic.

9. The impact damping mat of claim 2, wherein the upper layer comprises at least one interlocking feature thereon to engage adjacent structure.

10. The impact damping mat of claim 9, wherein the at least one interlocking feature comprises an elongate projection running along a majority of the length of a respective upper layer side wall.

11. A flooring system comprising:
at least one impact damping zone with a plurality of layers arranged in a stacked formation having a generally planar top surface, the plurality of layers having a total thickness no greater than 4 and 7/16 inches and cooperating to provide at least one of:
a coefficient of restitution no greater than 30%; and
a selected sound reduction characteristic, the selected sound reduction characteristic being a reduction of a maximum sound level of at least 5 dB from 40 to 63 Hz 1/3 octave bands and at least 13 dB at and above 80 Hz 1/3 octave bands normalized to 3/8 inch rollout rubber flooring.

12. The flooring system of claim 1, wherein the plurality of layers comprise a base layer, an intermediate layer and an upper layer.

13. The flooring system of claim 12, wherein the intermediate layer is a damping layer that is formed of a polyether urethane material, wherein the damping layer has a thickness of 1/4 of an inch to 1 and 1/2 inches, inclusive, and wherein the damping layer generally has a weight of less than 2.5 lbs per 1 ft².

14. The flooring system of claim 12, wherein the upper layer is formed of rubber and has a thickness of 1 inch to 1 and 1/2 inches, inclusive, and wherein the upper layer generally has a weight of less than 30 lbs per 4 ft².

15. The flooring system of claim 12, wherein the base layer is formed of rubber and has a thickness no greater than 1 inch and wherein the base layer generally has a weight of less than 300 lbs per 120 ft².

16. The flooring system of claim 12, wherein the plurality of layers further comprises a load distribution layer interposed between the intermediate layer and the upper layer.

17. The flooring system of claim 16, wherein the load distribution layer is formed of rubber and has a thickness of 3/16 of an inch to 7/16 of an inch, inclusive, and wherein the load distribution layer generally has a density of less than 70 lbs/ft3.

18. The flooring system of claim 11, wherein the plurality of layers cooperate to provide both the coefficient of restitution no greater than 30% and the selected sound reduction characteristic.

19. The flooring system of claim 12, wherein the upper layer comprises at least one interlocking feature that is a majority of the width of a respective side wall of the upper layer, the interlocking feature being adapted to engage an adjacent less damped zone.

20. The flooring system of claim 19, wherein the at least one interlocking feature comprises an elongate projection running along a majority of the length of a respective upper layer side wall.

* * * * *